(12) United States Patent
Takahashi et al.

(10) Patent No.: US 6,205,148 B1
(45) Date of Patent: Mar. 20, 2001

(54) APPARATUS AND A METHOD FOR SELECTING AN ACCESS ROUTER'S PROTOCOL OF A PLURALITY OF THE PROTOCOLS FOR TRANSFERRING A PACKET IN A COMMUNICATION SYSTEM

(75) Inventors: Eiichiro Takahashi, Yokohama; Makoto Inami, Tokyo, both of (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 08/925,288

(22) Filed: Sep. 8, 1997

(30) Foreign Application Priority Data

Nov. 26, 1996 (JP) ................................................ 8-314761

(51) Int. Cl.[7] .......................... H04L 12/28; H04L 12/56; H04J 3/16; H04J 3/22
(52) U.S. Cl. .......................... 370/401; 370/395; 370/466
(58) Field of Search .................................. 370/401, 402, 370/403, 404, 405, 395, 465, 466, 392

(56) References Cited

U.S. PATENT DOCUMENTS

| | | | |
|---|---|---|---|
| 5,010,572 | * 4/1991 | Bathrick et al. | 380/21 |
| 5,568,471 | * 10/1996 | Hershey et al. | 370/245 |
| 5,673,263 | * 9/1997 | Basso et al. | 370/396 |
| 5,708,654 | * 1/1998 | Arndt et al. | 370/242 |
| 5,917,820 | * 6/1999 | Rekhter | 370/392 |
| 5,946,311 | * 8/1999 | Alexander, Jr. et al. | 370/395 |

FOREIGN PATENT DOCUMENTS 6-205039    7/1994    (JP).

* cited by examiner

Primary Examiner—David R. Vincent
(74) Attorney, Agent, or Firm—Helfgott & Karas, PC.

(57) ABSTRACT

An apparatus and a method for selecting an access router's protocol from a plurality of protocols in a communication system including first and second access routers for transferring a packet between the access routers according to the selected protocol. The packet is originated/terminated by users having a user address assigned and accommodated in the respective access routers. Storage is provided in the apparatus for storing a protocol type of the access router corresponding to the user address. The first access router issues a protocol request signal including the user address. The apparatus receives the protocol request signal and referring to the storage, responds to the signal with the protocol type of the second access router accommodating the user having the user address included in the request signal. The first access router, selects a protocol common to the first and second access routers to transfer the packet based on the response.

19 Claims, 18 Drawing Sheets

PRIOR ART

FIG. 7A

| User Application |
|---|
| TCP/UDP |
| IPv4 |
| LLC/MAC |
| CSMA/CD |

(1) Packet betw Ethernet User & Access Router

FIG. 7B

| Address Resolution Request / Reply |
|---|
| NHRP |
| IPv4 |
| LLC/SNAP (RFC1483) |
| AAL Type5 |
| ATM |

(3) ARP Sig betw NHRP Server & Access Router

FIG. 7C

| Address Resolution Request / Reply |
|---|
| NHRP |
| IPv4 |
| LLC/SNAP (RFC1483) |
| AAL Type5 |
| ATM |

(5) ARP Sig betw NHRP Servers

FIG. 8A

| User Application |
|---|
| TCP/UDP |
| IPv4 |
| LLC/SNAP (RFC1483) |
| AAL Type5 |
| ATM |

(2) Packet betw Access Routers via ATM-SVC

FIG. 8B

| ATMF SIG or ITU-T DSS2 |
|---|
| SSCF-UNI |
| SSCOP |
| AAL Type5 |
| ATM |

(2) ATM-SVC Establishing Sig betw ATM Exch & Access Router

FIG. 8C

| ATMF PNNI or ITU-T B-ISUP |
|---|
| SSCF-NNI |
| SSCOP |
| AAL Type5 |
| ATM |

(7) ATM-SVC Establishing Sig betw ATM Exchanges

FIG. 9A

| User Application |
|---|
| TCP/UDP |
| IPv4 |
| LLC/SNAP (RFC1483) |
| CLNAP(ITU-T I.364) |
| AAL Type3/4 |
| ATM |

(4) Packet betw
CLSF Server &
Access Router

FIG. 9B

| User Application |
|---|
| TCP/UDP |
| IPv4 |
| LLC/SNAP (RFC1483) |
| CLNAP(ITU-T I.364) |
| AAL Type3/4 |
| ATM |

(4) Packet betw
CLSF Servers

FIG. 9C

| User Application |
|---|
| TCP/UDP |
| IPv4 |
| LLC/SNAP (RFC1483) |
| AAL Type5 |
| ATM |

(6) Packet betw
Ethernet User &
Access Router

IP-over-ATM protocol frame

Pure-ATM protocol frame

PRIOR ART

*1: CLNAP Protocol
*2: IP-over-ATM Protocol
*3: PUre-ATM Protocol
　　└── 00 (binary): Not installed
　　　　11 (binary): Installed \* TYPE= 20 (decimal): Failure to Transfer Packet
(Protocol Mismatch)
\*\* CODE: Destination Access Router's Protocol (Router type)
0: (Reserved)
1: CLNAP Protocol
2: IP-over-ATM Protocol
3: Pure-ATM Protocol Inverse-ARP Request Inverse-ARP Response

APPARATUS AND A METHOD FOR SELECTING AN ACCESS ROUTER'S PROTOCOL OF A PLURALITY OF THE PROTOCOLS FOR TRANSFERRING A PACKET IN A COMMUNICATION SYSTEM

BACKGROUND OF THE INVENTION

1. Field of the Invention

The present invention relates to an Internet Protocol (abbreviated to IP) packet transfer service network (abbreviated to IP network) having as a core network, an ATM network which transfers data in an Asynchronous Transfer Mode (ATM). It relates particularly to an apparatus and a method for selecting a router's communication protocol (simply called a protocol) for transferring an IP packet between the access routers.

Recently, communication systems have spread widely, which use the ATM network for network services and IP interchanges packets (e.g., data for use in computer communications) in a layer above the ATM layer of the Open Systems Interconnection (OSI). There are various methods for transferring an IP packet through the ATM network. Whichever method is used, a highly reliable method for transferring IP packets is in great demand.

2. Description of the Related Art

FIG. 1 is a diagram showing the configuration of an IP network system. Of the system components constituting the network system, only the components related to the present invention are shown in the figure.

There are two types of access routers: a type-A router provided at a user site and a type-B router offered by the network. Both accommodate terminal equipment, etc., (hereinafter called an IP user) of the IP packet transfer service network (IP network) and performs routing processing for directing the packet to/from the IP users.

The access router is assigned with a particular address (called ATM address) for identification in the network. Also, the IP user is assigned with a particular address (called IP address) for identification in the network.

An ARP/NHRP server (general term of an ARP server and an NHRP server) manages the access router's ATM address corresponding to the IP address of the IP user accommodated in the access router. The ARP server functions alone in the network, whereas the NHRP server which is a type of the ARP server, functions in a wide-area network that is divided into plural core networks, each including an ARP server and manages the ATM address of an access router existing in other core network by communicating with the ARP server in charge of the other core network.

A CLSF (Connectionless Service Function) server, which is provided in the ATM network, performs connectionless data exchange processing including routing processing, according to a connectionless data protocol. In the ATM network, the CLSF servers have fixed interconnection called ATM-PVC (Permanent Virtual Circuit) to transfer data in the ATM mode therebetween.

FIG. 2 shows the types and configuration of the access routers. There are three protocols used by the access routers: CLNAP (Connectionless Network Access Protocol, called method 1), IP-over-ATM (called method 2) and pure-ATM (called method 3). Thus, according to the protocol used, there are four types of access routers: CLNAP type, IP-over-ATM type, pure-ATM type and ALL type which uses all of the three protocols.

In the figure, an element enclosed in a box within the access router is a control program or a control circuit for executing each protocol. For example, the "ARP/NHRP" obtains from the aforesaid ARP/NHRP server, the ATM address of a destination access router corresponding to a destination IP address to which a packet is to be directed. The "ATM-SVC" establishes a connection called an ATM-SVC (Switched Virtual Circuit) based on the ATM address, with a destination access router in the ATM mode. The "P" transfers an IP packet in the ATM mode via the thus-established connection. FIG. 3 is a schematic diagram illustrating a conventional communication system. An example is shown here in which a forwarding access router having the CLNAP protocol (method 1) installed attempts to communicate with a destination access router having no CLNAP protocol installed.

On receiving from an originating IP user an IP packet to be transferred to a destination IP user having an IP address, the forwarding access router first obtains from the ARP/NHRP server (not shown), the ATM address of the destination access router accommodating the destination IP user having the IP address (hereinafter called the ATM address corresponding to the destination IP address). It then transmits the IP packet to the destination access router having the thus-obtained ATM address assigned, according to the aforesaid CLNAP protocol.

However, since the destination access router has not the CLNAP protocol installed, the transmitted IP packet cannot be received by the destination access router and is lost within the network. Moreover, since there is no way for the forwarding access router to recognize the lost IP packet, it continues to transmit IP packets in succession, eventually losing all the IP packets transmitted and finally disabling communication.

FIG. 4 is a schematic diagram illustrating another conventional communication system. An example is shown here in which a forwarding access router having the IP-over-ATM protocol (method 2) installed attempts to communicate with a destination access router having no IP-over-ATM protocol installed.

First, the forwarding access router establishes a connection (ATM-SVC) with the destination access router by using the ATM address which was obtained from the ARP/NHRP server (not shown). Then, it transmits the IP packet onto the thus-established connection in the ATM mode (i.e., according to the IP-over-ATM protocol), while encapsulating the IP packet into the AAL-PDU according to the RFC1483.

Here, it is assumed that the destination access router has the pure-ATM protocol installed instead of the IP-over-ATM protocol and has the IP protocol not defined in a higher-layer user protocol, as is the case with dynamic image data transferred on the ATM connection. Then, the destination access router can receive the transmitted AAL-PDU (Protocol Data Unit) payload but cannot interpret the payload because the aforesaid LLC is not defined, causing the same result as losing the packet within the network. Moreover, since there is no way for the forwarding access router to recognize the lost IP packet, it continues to transmit IP packets in succession, eventually losing the transmitted IP packets and finally disabling communication.

In the conventional method as described above, it is a problem that the transmitted packets are lost within the network and commutation is disabled in case the protocols disagree between the forwarding and destination access routers, in an IP network which is a wide-area public network accommodating a great many and unspecified IP users and which includes as a core network an ATM network having various protocols available for transferring IP packets.

SUMMARY OF THE INVENTION

It is an object of the present invention to provide an apparatus and a method for selecting an access router's communication protocol for transferring an IP packet, which can prevent a transmitted packet being lost within the network and therefore, communication becoming disabled. It is another object of the present invention to provide an economical apparatus and method for selecting an access router's communication protocol for transferring an IP packet.

To achieve the above and other objects, the present invention provides storage means, protocol request means and protocol response means.

In a communication system including first and second access routers for transferring a packet therebetween according to the protocol, the packet originated/terminated by users having a user address assigned and accommodated in the respective access routers, the storage means stores therein a protocol type of the access router corresponding to the user address. The protocol request means, which is provided in the first access router, issues a protocol request signal including the user address. The protocol response means receives the protocol request signal and referring to the storage means, responds to the signal with the protocol type of the second access router accommodating the user having the user address included in the protocol request signal.

BRIEF DESCRIPTION OF THE DRAWINGS

FIGS. 7A–7C are diagrams showing protocol stacks at communication points in FIG. 6 (part 1);

FIGS. 8A–8C are diagrams showing protocol stacks at communication points in FIG. 6 (part 2);

FIGS. 9A–9C are diagrams showing protocol stacks at communication points in FIG. 6 (part 3);

Throughout the above-mentioned drawings, identical reference numerals are used to designate the same or similar component parts.

DESCRIPTION OF THE PREFERRED EMBODIMENTS

First, the international standards (rules and recommendations) relating to the present invention are outlined below: ITU-T recommendation I.364 stipulates an ATM-based connectionless service. It achieves the connectionless communication using the CLSF server by defining a CLNAP packet in the AAL-PDU payload of the layer above the ATM layer (i.e., AAL 3/4 layer) and specifying a destination ATM address in the header of the packet.

ITU-T recommendation E.164 stipulates an International Dialing Plan comprehensively for the existing ISDN service and the telephone service including the ATM services.

ITU-T recommendation Q.2931 stipulates signal interface procedures for the ATM-SVC (Switched Virtual Circuit) connection service. The signal procedures are based on the N-ISDN (Q.391).

RFC1483 stipulates a multi-protocol encapsulation method for encapsuling plural user protocols (LAN protocols) in ATM (AAL) protocol data unit. It informs the destination user of the encapsuled protocols by specifying the protocol types in the capsulation header of the AAL-PDU payload.

RFC1577 stipulates the address resolution for resolving the ATM address corresponding to the IP address. It is used in the present invention as a signal procedure between the access router and the ARP/NHRP server.

Here, ITU-T recommendations are the international recommendations already put into effect by the ITU (International Telecommunication Union). The RFC are standards in the industrial field, which are implemented by the IETF (Internet Engineering Task Force) and authorized internationally as a de facto standard.

Figure 6:
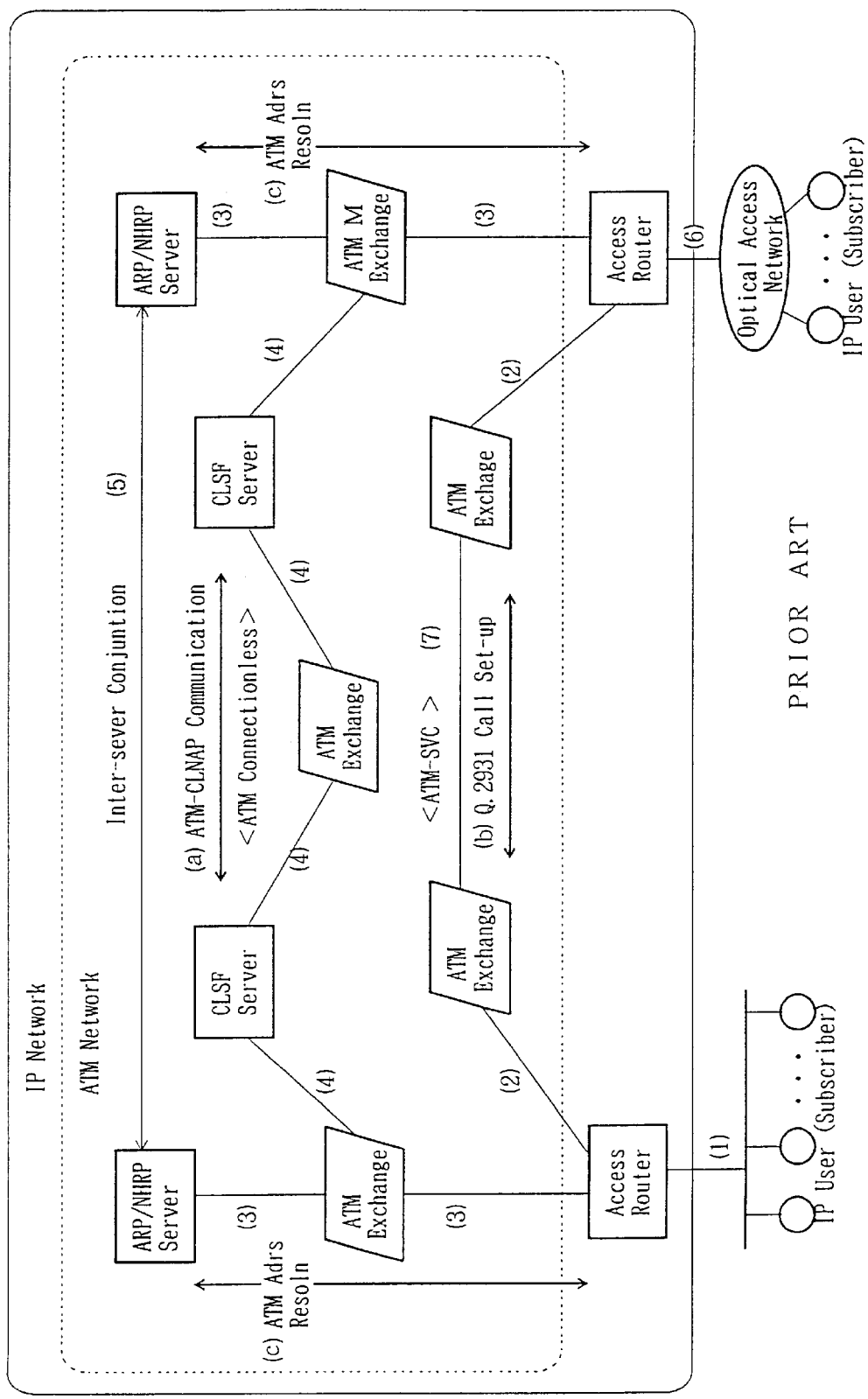
FIG. 6 is a diagram showing a network configuration in which the present invention is implemented.

FIG. 6 is a diagram showing a network configuration in which the present invention is implemented, illustrating particularly (a) ATM-CLANAP communication, (b) switched connection (ATM-SVC) and (c) ATM address resolution.

FIGS. 7A–7C to 9A–9C are diagrams showing protocol stacks at communication points in FIG. 6. (1)–(7) in FIGS. 7–9 correspond to the communication points in FIG. 6. TCP/DP, IPv4, LLC/MAC, CSMA/CD, etc. are the protocols defined by the aforesaid international standards. For example, FIG. 7B-(3): ARP Signal between NHRP Server and Access Router represents the ARP signal transmitted at the communication points (3) in FIG. 6. That is, the NHRP protocol edited in the format shown in FIG. 15 (shown later) at an access router is sequentially processed according to the internationally defined protocols IPv4, LLC/SNAP. AAL Type 5 and ATM to be divided into ATM cells and is sent to the NHRP/ARP Server.

The access router's protocols are detailed below based on FIGS. 10A–10D, referring to FIG. 6 and FIGS. 7A–9C. FIGS. 10A–10D illustrate the access router's protocols.

Method 1 (CLNAP protocol)

This method, which conforms to the ITU-T recommendation I.364, divides the IP packets (or CLNAP packets) into ATM cells in a low layer and transfers the cells in the connectionless mode. The CLNAP packet, which is a protocol data unit defined in a layer above the AAL (ATM Adaptation Layer) 3/4 of the OSI layer (see FIG. 10A), has a destination IP address and an originating IP address set in the protocol header.

The ATM address (conforming e.g., to the ITU-T recommendation E164) of an access router to which the ATM cell is transferred is determined based on the destination IP address set in the IP packet. Determining the ATM address in this way conforming to the IETF RFC1577 is hereinafter called address resolving or address resolution. That is, the forwarding access router obtains the ATM address from the ARP/NHRP server based on the destination IP address (see FIG. 6-(c) and FIG. 10D) and sets the address in the CLNAP packet.

The CLNAP packets are transferred in a way they wander in a packet unit from a CLSF server to another (see FIG. 6-(a)). The CLSF servers each transfer the CLNAP packets in the connectionless mode by routing respective packets on reference to the ATM address set in the protocol header.

The method 1 provides connectionless-type communication, whereas the later-explained methods 2 and 3 provide connection-type communication where application data is transferred via the ATM connection (or AAL connection) which was previously established end to end by conducting an exchange-call-set-up operation.

In method 1, since the ATM cell is switched based on the virtual path identifier (VPI) and virtual channel identifier (VCI) which are set every time a connection is established, there is no need to define a packet (or protocol data unit: PDU) in an application layer and set the destination address for each packet.

Method 2 (IP-over-ATM or LLC capsulation protocol)

This method, which conforms to the ITU-T recommendations Q.2931, RFC1483 and RFC1577, establishes an ATM connection of the switched circuit (ATM-SVC) between the access routers (see FIG. 6-(b)) and transfers via the connection the IP packets divided into the ATM cells.

The ATM address required for establishing the connection is address-resolved by using the destination IP address set in the IP packet, in accordance with the IETF RFC1577. That is, the access router obtains the ATM address from the ARP/NHRP server by using the destination IP address (see FIG. 6-(c)). Based on the thus-obtained destination ATM address, an ATM connection of the switched circuit (ATM-SVC) is established (see FIG. 6-(b) and FIG. 10D) according to the ITU-T recommendations Q.2931.

After the connection is established, the IP packet is encapsuled into an AAL-PDU according to the RFC1483-based LLC (Logical Link Control) protocol and transferred on an ATM-cell basis via the connection. The encapsulation method used here is defined in the payload of AAL-PDU as the LLC header (see FIG. 10B) and the encapsuled protocol (e.g., IP protocol in this case) is interpreted based on the LLC header at the receiving side.

Method 3 (pure-ATM or port access protocol)

Figure 10A:
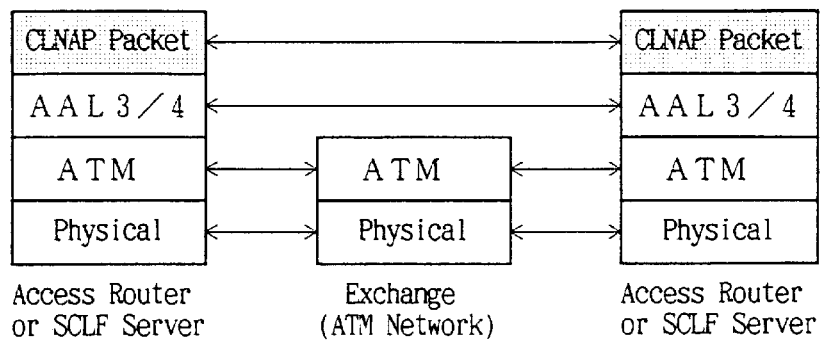
FIG. 10A is a diagram illustrating the CLNAP protocol.
Figure 10B:
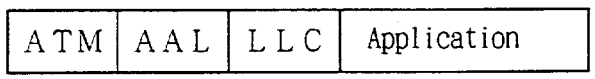
FIG. 10B shows the IP-over-ATM protocol frame.
Figure 10C:
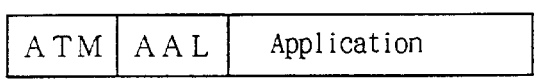
FIG. 10C shows the pure-ATM protocol frame.
Figure 10D:
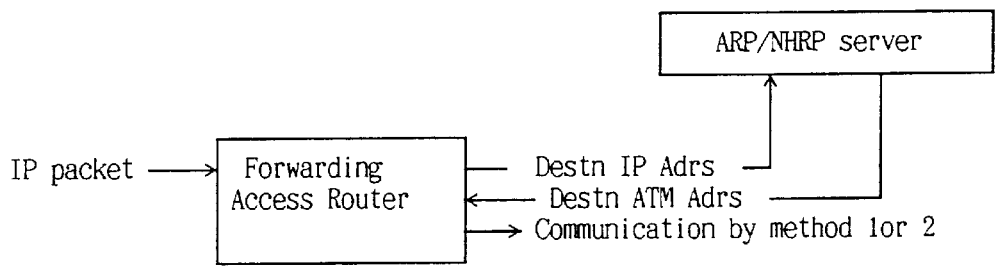
FIG. 10D is a is a diagram illustrating the address resolution protocol.

This method, which conforms to the ITU-T recommendation Q.2931, establishes an ATM connection of the switched circuit (ATM-SVC) between the forwarding and destination access routers (see FIG. 6-(b)) and transfers the IP packet divided into ATM cells via the connection merely as usual data (see FIG. 10C). That is, the IP packet is transferred in a circuit switching fashion without being encapsuled, unlike method 2.

In this method, since the network need not recognize user's circumstances (e.g., the LAN protocol as the user data) and the user is well aware of the destination ATM address, the address resolution by using the network-provided ARP/NHRP server is not conducted, unlike the aforesaid method 1 or 2. The user need only define an application (e.g., IP) of its own in a layer above the AAL layer and transfer the application data as a payload of the AAL-PDU only by using the ATM network service (i.e., ATM switching function).

Figure 11:
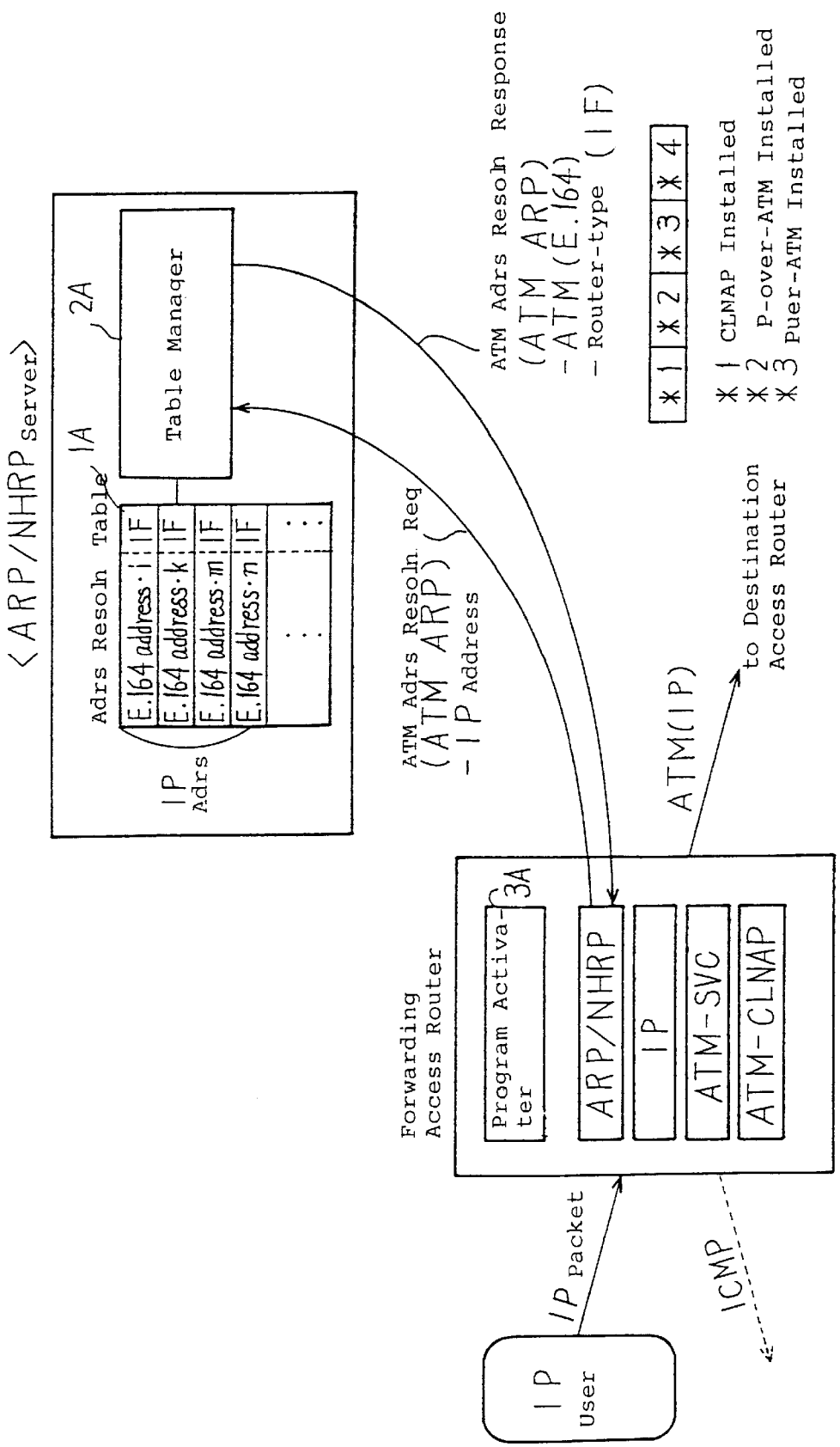
FIG. 11 is a schematic diagram illustrating the first embodiment of the present invention.

FIG. 11 is a schematic diagram illustrating the first embodiment of the present invention. The present invention functions in the same network environment as explained above with the conventional method. It is directed to an IP user who uses system resources such as the CLSF server and the ARP/NHRP server provided in the ATM network which is included as a core network in the IP packet transfer service network (abbreviated to IP network) and also to a pure ATM user who uses only the ATM exchange function of the ATM network.

In the communication using the method 1 (CLNAP protocol) or method 2 (IP-over-ATM protocol) as explained above, prior to communication, the ATM address of the access router accommodating the destination IP user concerned is required, i.e., the address resolution is required. Furthermore, to prevent a packet being lost within the network or communication becoming disabled as was the case with the conventional method, the forwarding access router need be aware of the protocol installed in the destination access router.

Accordingly, the present invention has added the access router's protocol information (called a router type, shown in FIG. 11 as IF) to the address resolution table 1A which is provided in the ARP/NHRP server. Hereinafter, the information registered in the address resolution table 1A, including the ATM address and the router type, is called management information.

Figure 1:
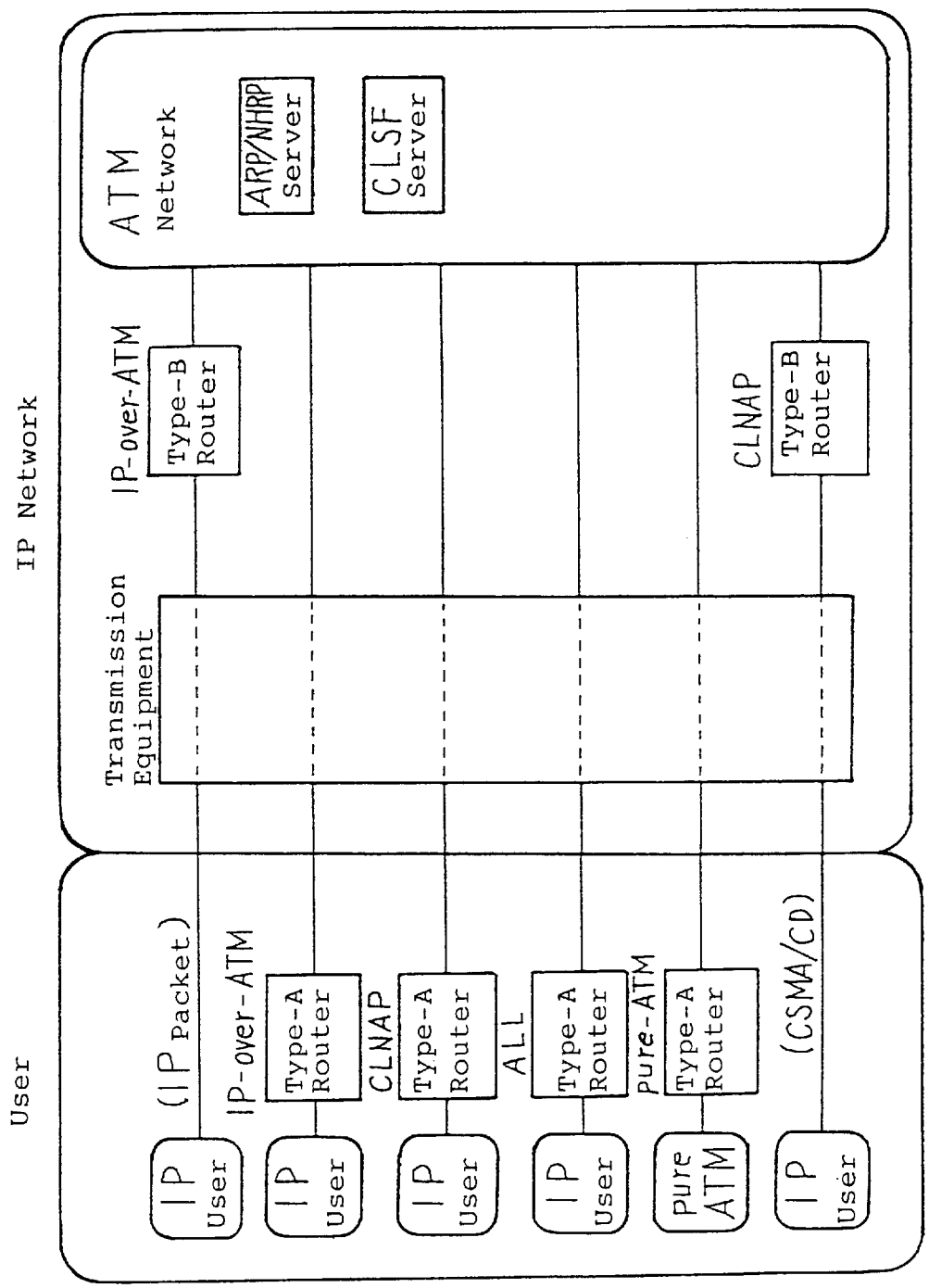
FIG. 1 is a diagram showing the configuration of an IP network system.
Figure 2:
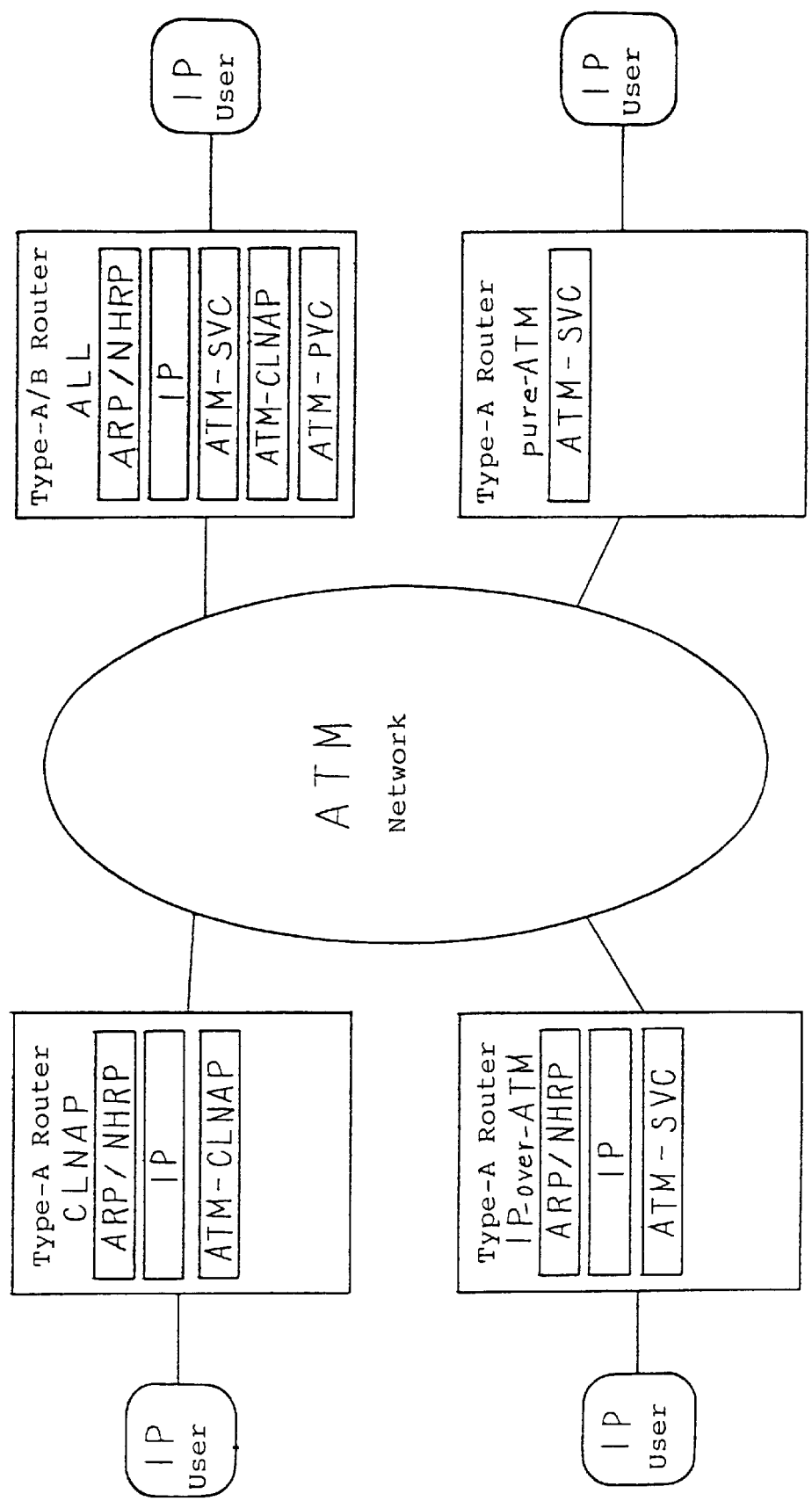
FIG. 2 shows the types and configuration of the access routers.
Figure 3:
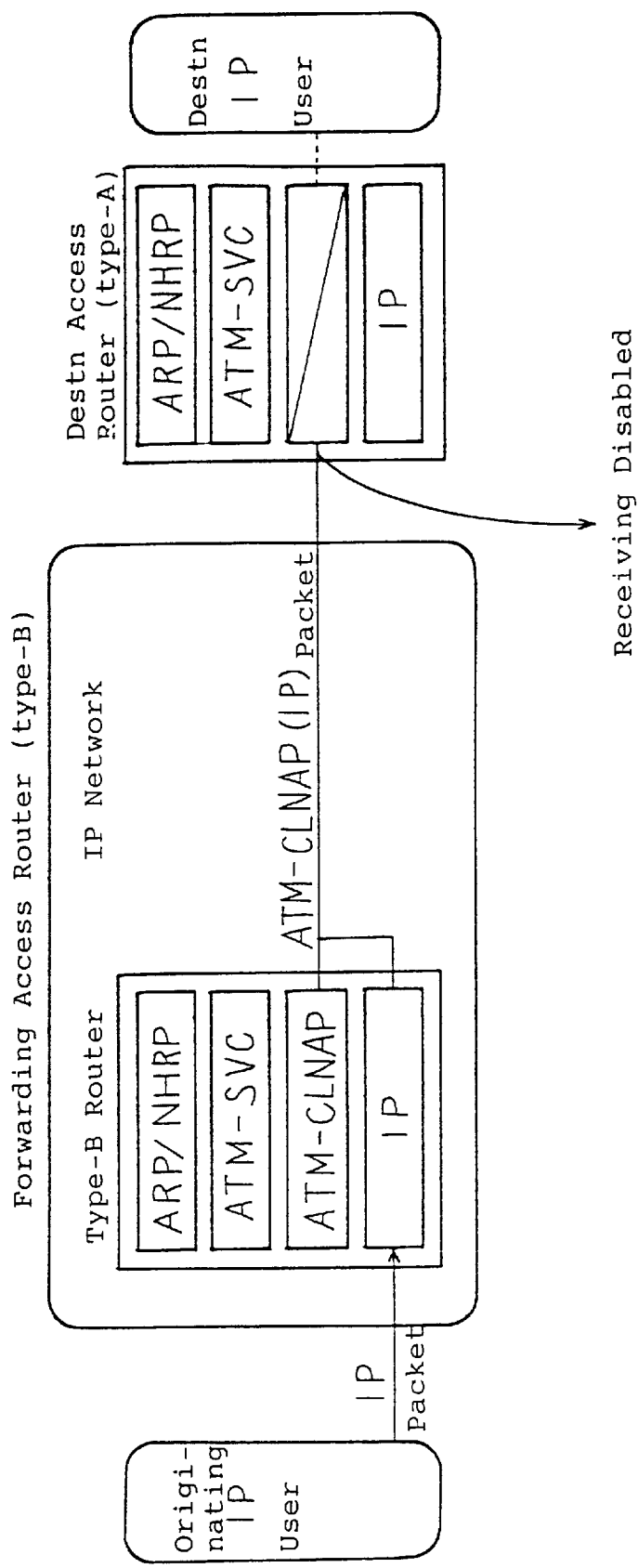
FIG. 3 is a schematic diagram illustrating a conventional communication system.
Figure 4:
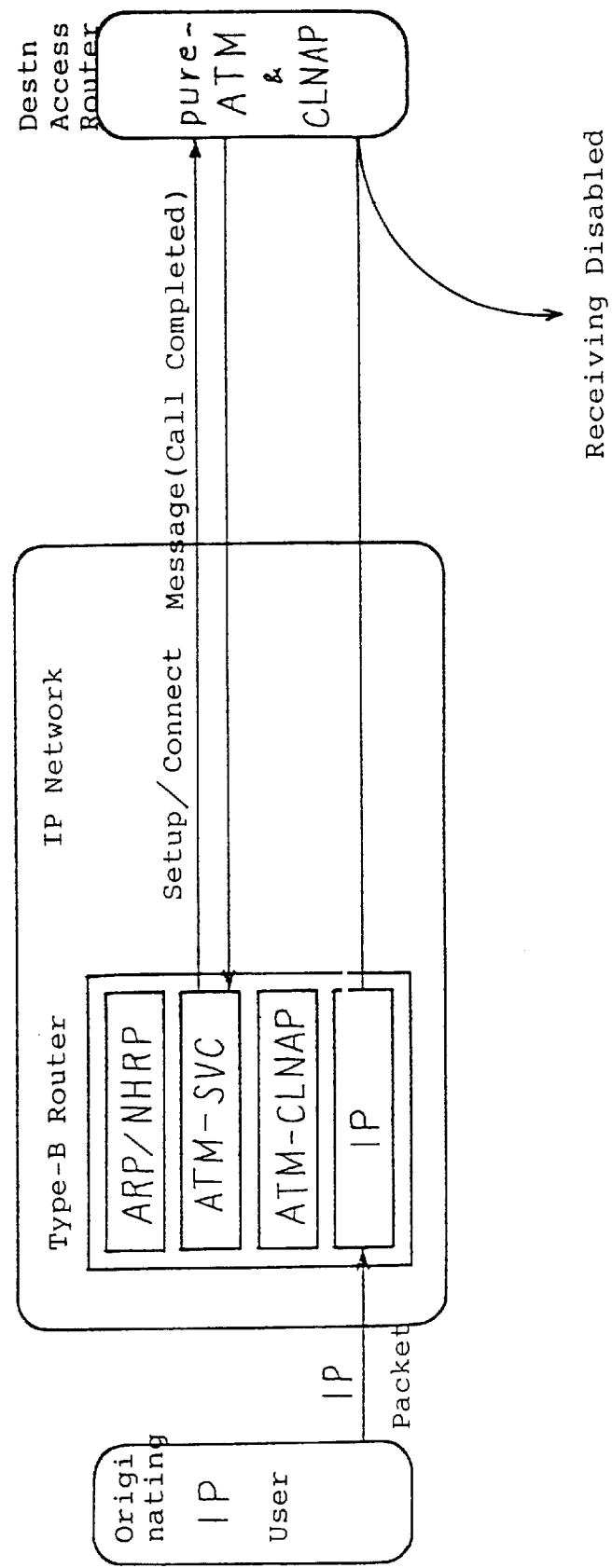
FIG. 4 is a schematic diagram illustrating another conventional communication system.

The access router accommodates an IP user who originates and terminates IP packets to and from the IP network and has any of or plural aforesaid method 1–3 protocols installed for transferring the IP packets via the ATM network (see FIG. 2).

In FIG. 11, the forwarding access router is provided with ARP/NHRP, IP, ATM-SVC and ATM-CLNAP programs (control circuits). The ATM-CLNAP and IP programs control the method 1 and 2 protocols, respectively. The ARP/NHRP program performs the address resolution by communicating with the ARP/NHRP server. The ATM-SVC program establishes a switched connection (ATM-SVC) with the ARP/NHRP server or destination access router. A program activator 3A activates and executes the aforesaid programs.

The ARP/NHRP server is permanently connected (ATM-PVC) with respective access routers and executes the address resolution protocol by using the address resolution table 1A. That is, a forwarding access router sends to the ARP/NHRP server, an address resolution request signal including an IP address as a parameter. At the request, a table manager 2A of the ARP/NHRP server retrieves from the address resolution table 1A, the ATM address and the router type corresponding to the IP address and responds to the request signal with the retrieved ATM address and the router type as a parameter.

Thus, when the forwarding access router requests the ATM address prior to communication, the ARP/NHRP server responds with the destination access router's router type (*1, *2 and *3 in the figure) as a parameter, in addition to the ATM address. Thereafter, the forwarding access router transmits IP packets using a protocol which is common to the forwarding and destination access routers.

When the forwarding access router does not have the destination access router's protocol installed, it notifies its IP user of unsuccessful communication by means of the ICMP (Internet Control Message Protocol) and therefore, can prevent transmitted data being lost within the network and communication becoming disabled.

Figure 12:
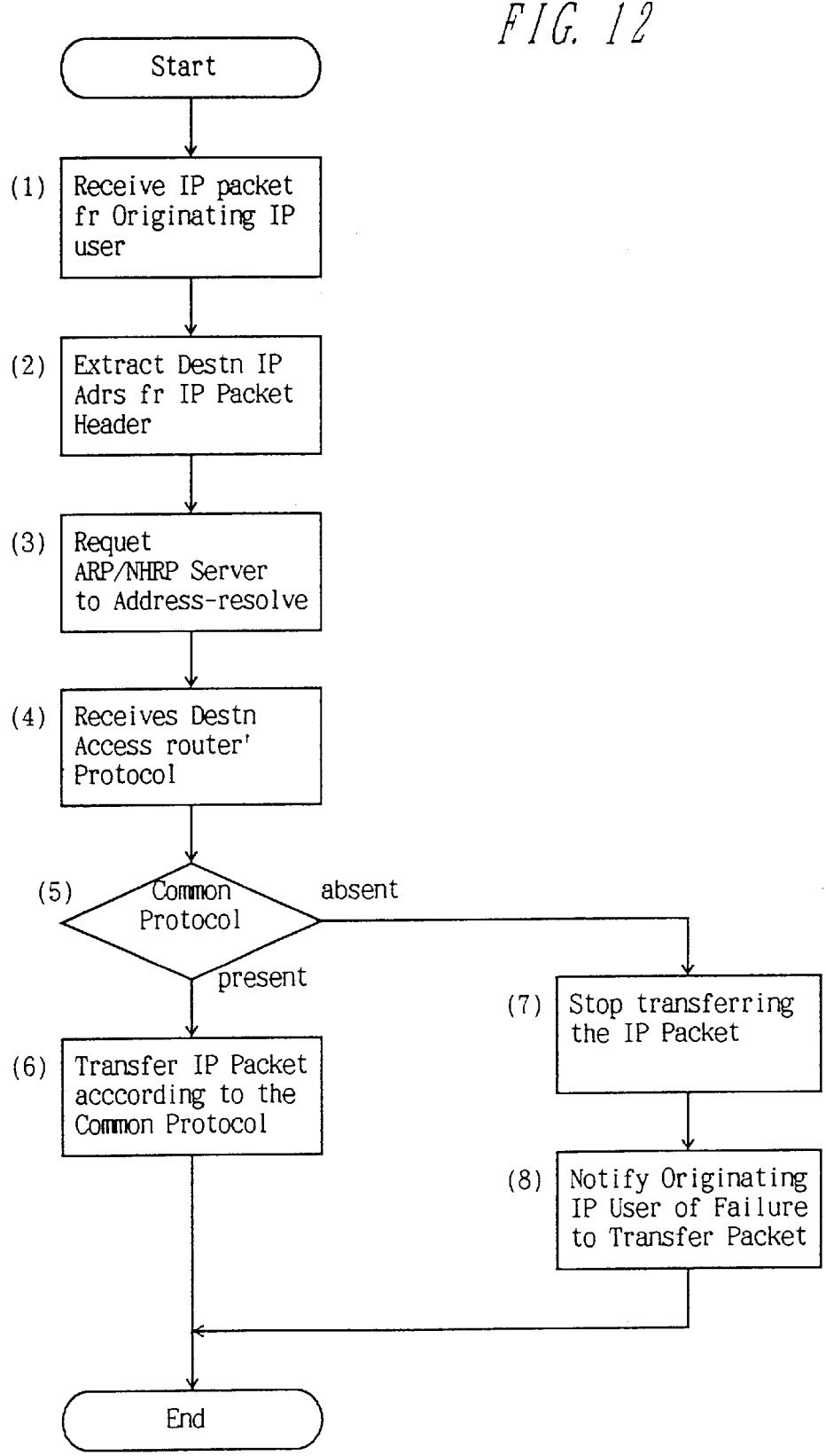
FIG. 12 is a flowchart illustrating the first embodiment of the present invention.

The operation of the first embodiment of the present invention is explained based on the FIG. 12-flowchart, referring to FIG. 11.

(1) A forwarding access router receives from an IP user, an IP packet to be transmitted to a destination IP user, and (2) Interprets the header of the IP packet and extracts the destination IP address therefrom.

(3) The forwarding access router prepares an ATM-ARP (address resolution request) signal including the destination address as a parameter and sends the signal to the ARP/NHRP server to ask for the address resolution.

(4) In the ARP/INHRP server, based on the destination IP address included in the ATM-ARP signal received, the table manager 2A retrieves from the address resolution table 1A, the destination access router's ATM address (e.g., address stipulated by the E.164) and the router type (IF) and responds the ATM-ARP signal with the retrieved information as a parameter.

(5) In the forwarding access router, based on the responded router type, the program activator 3A determines whether there is any protocol common to the forwarding and destination access routers.

(6) If the determination is positive (present), the IP packet is transferred by using the common protocol. When method 1 (CLNAP protocol) is used as the common protocol, the program activator 3A activates the ATM-CLNAP program and transfers IP packets in the connectionless mode by setting an ATM address for each CLNAP packet. When method 2 (IP-over-ATM protocol) is used, the program activator 3A activates the ATM-SVC program to establish a connection with the destination access router based on the ATM address and according to the aforesaid SVC procedures stipulated in the Q.2931. Thereafter, it activates the IP program to transfer IP packets while subjecting them to the REC1483 encapsulation procedure. When method 3 (pure-ATM protocol) is used, there is no need of address resolution by the ARP/NHRP server because the ATM address is already known to the user and previously set in the IP packet. The forwarding access router need only establish a connection with the destination access router (based on the ATM address and according to the aforesaid SVC procedures stipulated in the Q.2931) and transfer the IP packet as it is via the connection.

(7) If the determination is negative (absent), the program activator 3A does not activate the IP, ATM-SVC or ATM-CLNAP program so as to stop transferring the IP packet, but (8) Notifies the originating IP user of a failure to transfer the IP packet by using the aforesaid ICMP or the definition shown in FIG. 17 (explained later).

Figure 13:
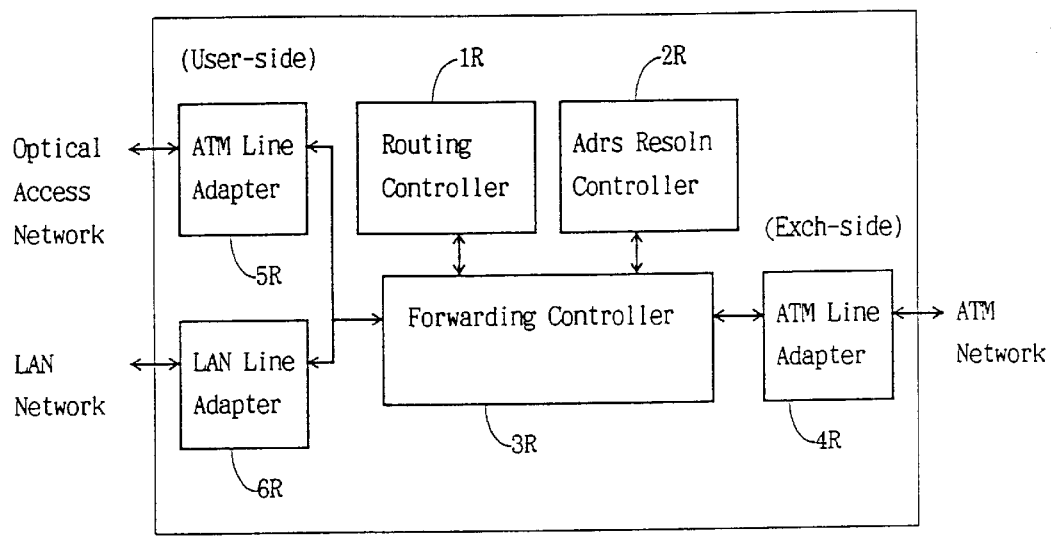
FIG. 13 is a block diagram illustrating the access router of the present invention.

The first embodiment of the present invention is detailed below, referring to FIGS. 13 and 14. FIG. 13 is a block diagram illustrating the access router of the present invention. An ATM-line adapter 5R and LAN-line adapter 6R, connected to an IP user (or subscriber) via an optical line and LAN line respectively, transmit and receive IP packets to and from the IP user. An ATM-line adapter 4R transmits and receives IP packets to and from the ATM network which includes ATM exchanges.

A routing controller 1R, which has a routing table storing routing information for routing a packet in the IP network, interprets the routing information protocol defined in the IP network and based on the interpretation, generates and regenerates the routing information in the table.

An address resolution controller 2R obtains the router information including the ATM address and the destination access router's protocol based on an IP address when the address resolution is required in transferring an IP packet. If the required router information is stored in a built-in memory, the controller 2R obtains the information from the memory. If not, it sends to the ARP/NHRP server an address resolution request message including the destination IP address as a parameter and receives the required router information in return.

A forwarding controller 3R forwards an IP packet from an IP user to the ATM network or vice versa. When sending the packet to the ATM network, the controller 3R extracts the destination IP address from the IP packet received from the ATM-line adapter 5R or LAN-line adapter 6R and based on the IP address, requests the routing controller IR to determine an IP address of the next-forwarding point. Then the controller 3R requests the address resolution controller 2R to determine the ATM address and the destination access router's protocol corresponding to the thus-determined IP address. Based on the then-determined ATM address and protocol, it sends the IP packet to the ATM network via the ATM-line adapter 4R.

When receiving the packet from the ATM network, the controller 3R extracts the destination IP address from the IP packet received from the ATM-line adapter 4R and based on the IP address, requests the routing controller 1R to determine an IP address of the next-forwarding point. Based on the thus-determined IP address, the controller 3R sends the IP packet to the optical line or the LAN line via the ATM-line adapter 5R or LAN-line adapter 6R, respectively.

Figure 14:
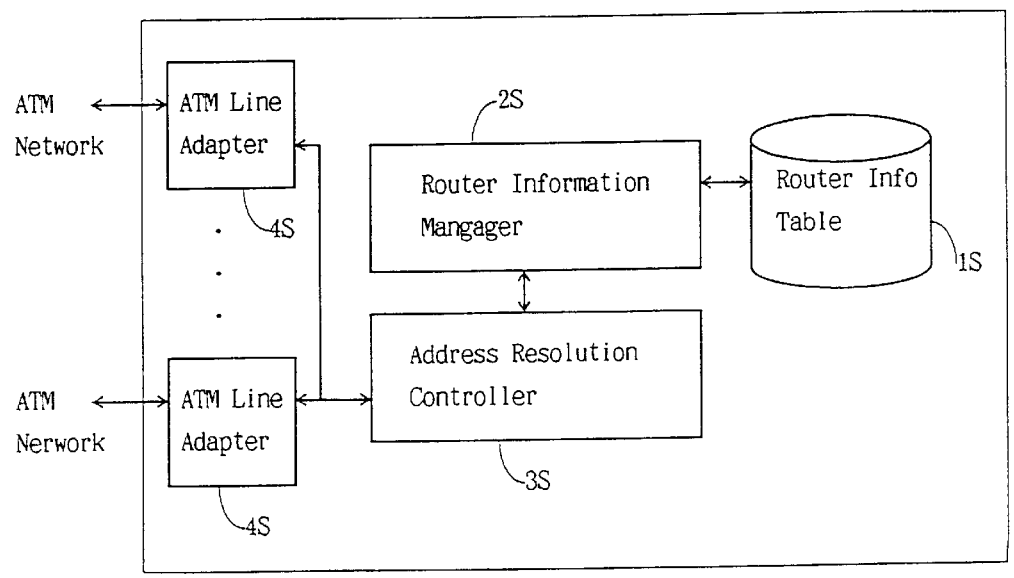
FIG. 14 is a block diagram illustrating the ARP/NHRP server of the present invention.

FIG. 14 is a block diagram illustrating the ARP/NHRP server of the present invention. An ATM-line adapter 4S receives the address resolution request message from and transmits the address resolution response massage to the ATM network. A router information table 1S is a database storing the ATM address and protocol of an access router corresponding to an IP address.

A router information manager 2S performs the address resolution based on the IP address received. That is, it retrieves from the router information table 1S, the ATM address and protocol of an access router corresponding to the IP address.

An address resolution controller 3S interprets an address resolution request message received from an access router via the ATM-line adapter 4S to extract the IP address from the message and asks the router information manager 2S for the address resolution based on the extracted IP address. Then the controller 3S receives a result of the address resolution, i.e., the router information including the resolved ATM address and protocol) and sends the information to the access router as the address resolution response massage.

Figure 15:
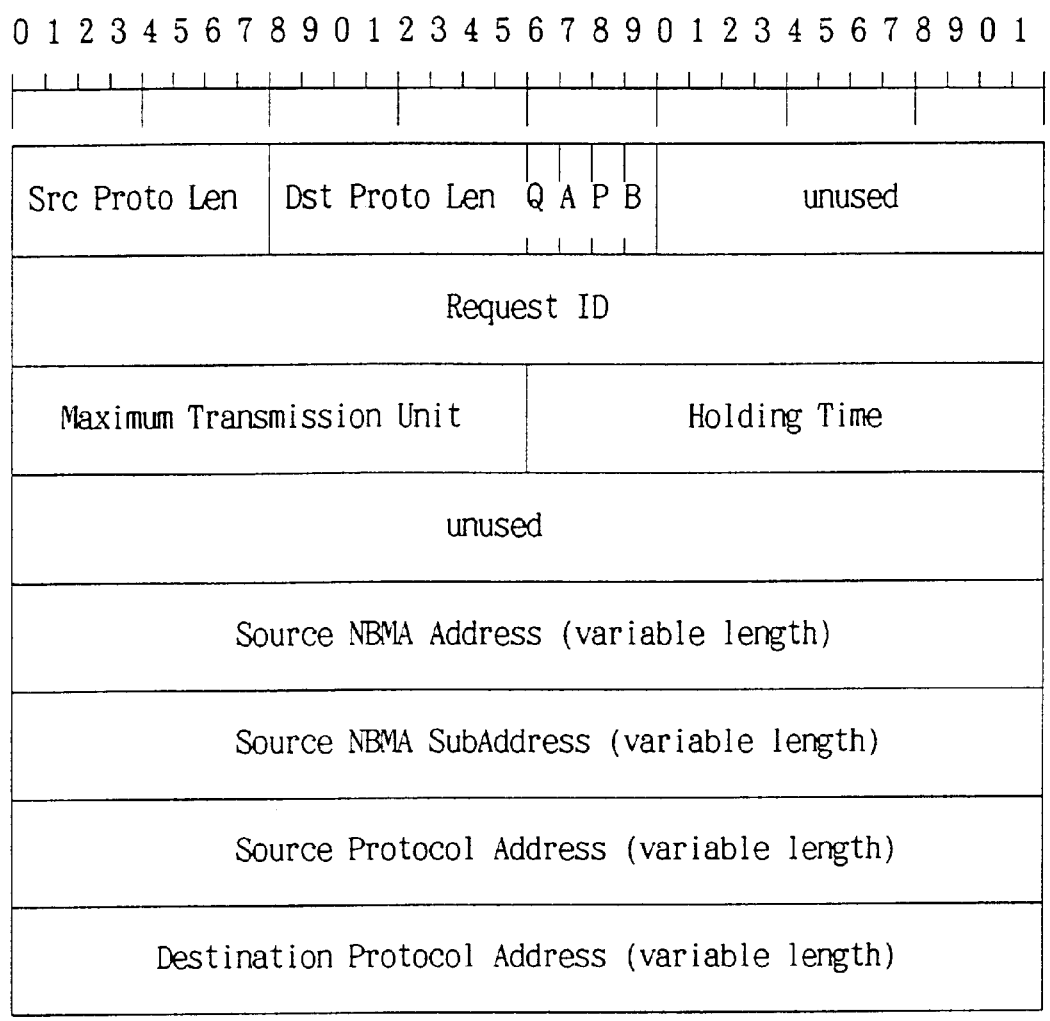
FIG. 15 shows a detailed format of the address resolution request signal.

FIG. 15 shows a detailed format of the address resolution request signal. The "Source NBMA Address" and "Source NBMA Subaddress" represents the ATM address of the forwarding access router. The "Source Protocol Address"

represents the IP address of the originating IP user. The "Destination Protocol Address" represents the ATM address of the IP address of the terminating IP user. The ARP request (or later-explained inverse ARP request) is specified by the "Request ID". For definitions of other fields, refer to document on the related international standards.

Figure 16:
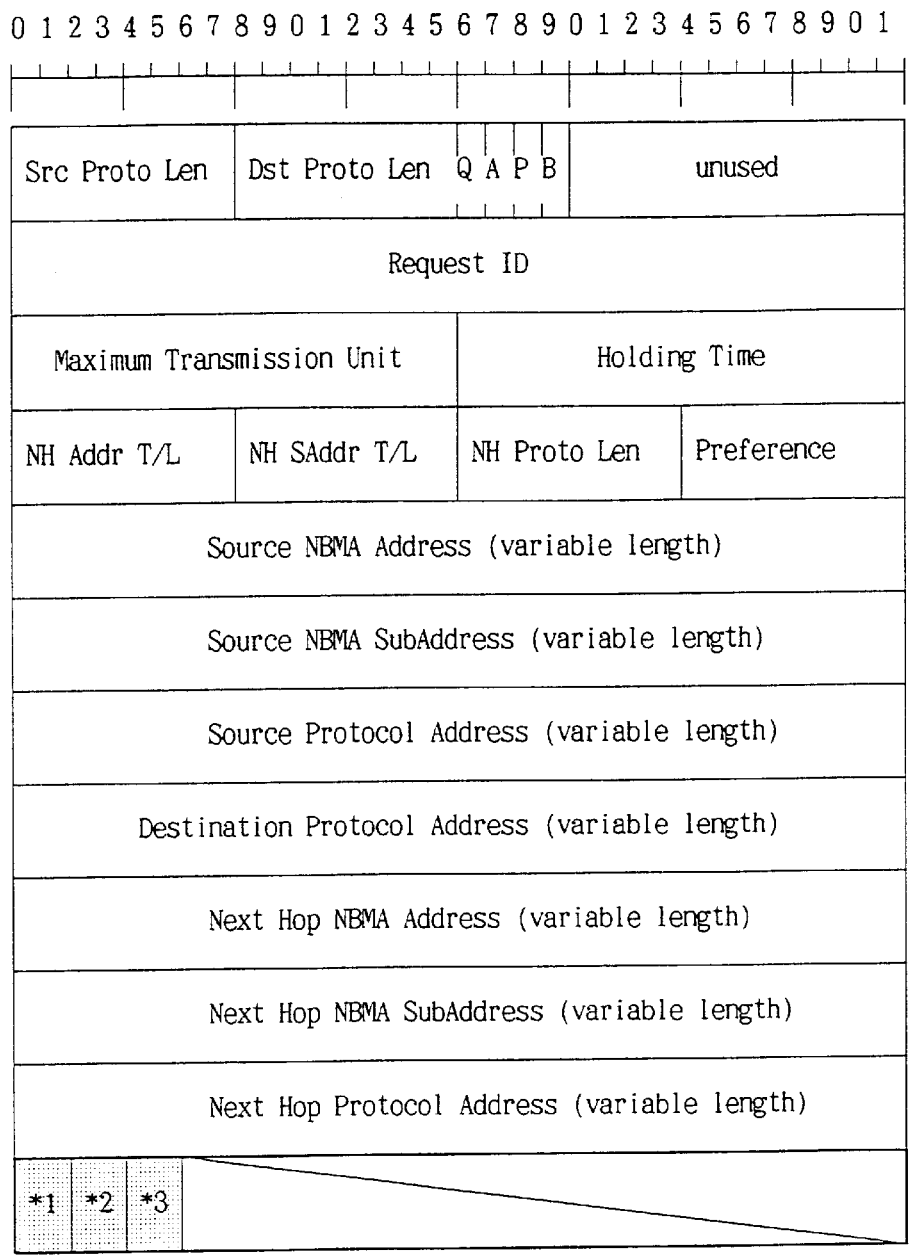
FIG. 16 shows a detailed format of the address resolution response signal.

FIG. 16 shows a detailed format of the address resolution response signal. The "Source NBMA Address" and "Source NBMA Subaddress" represents the ATM address of the forwarding access router. The "Source Protocol Address" represents the IP address of the originating IP user. The "Destination Protocol Address" represents the ATM address of the IP address of the terminating IP user. The "Next Hop NBMA Address" and "Next Hop NBMA Subaddress" represents the ATM address of the destination access router. The "Next Hop Protocol Address" represents the IP address of the destination IP user. The "Request ID" specifies that the signal is a response to the ARP request (or later-explained inverse ARP request). For definitions of other fields, refer to document on the related international standards.

The present invention has added router type information (IF) *1, *2 and *3 (shown in halftone, each consisting of two bits) to the above address resolution response signal. Two bits each of *1, *2 and *3 being 11 indicates that the destination access router has the protocol CLNAP, IP-over-ATM and pure-ATM installed, respectively. The two bits being 00 indicates that the destination access router has no corresponding protocols installed.

Figure 17:
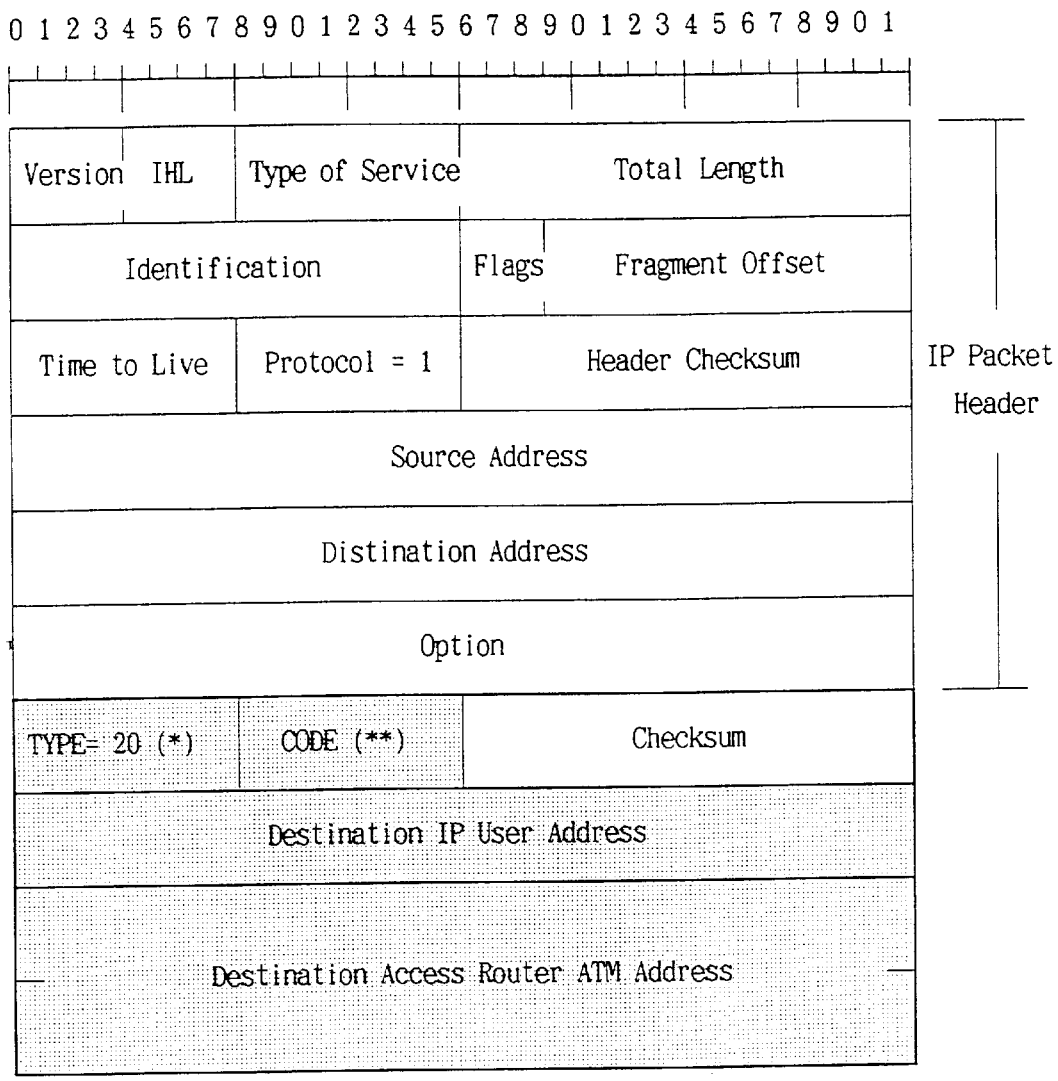
FIG. 17 shows a signal format indicating detailed reasons for a failure to transfer an IP packet.

FIG. 17 shows a signal format indicating detailed reasons for a failure to transfer an IP packet. In the white-background areas are definitions standardized as the aforesaid ICMP (for details, refer to document on the related international standards). In the halftone areas are those defined additionally for the present invention. Specifying decimal 20 for example, in the TYPE field indicates "a failure to transfer the packet" due to router type disagreement (i.e., the destination access router has not the same protocol installed as the forwarding access router). Details of "a failure to transfer data" are indicated in the CODE field (e.g., as *1, *2 and *3 as in FIG. 11) to represent the destination access router's protocols, respectively.

The second embodiment of the present invention is explained below based on FIGS. 18A, 18B to 21:

First, an inverse address resolution protocol (hereinafter abbreviated to inverse ARP) function is explained referring to FIGS. 5A–5C. The inverse ARP is a protocol by which the ARP/NHRP server collects from a subordinate access router, its address information, i.e., the ATM address of the router and IP address of its IP user.

Figure 5A:
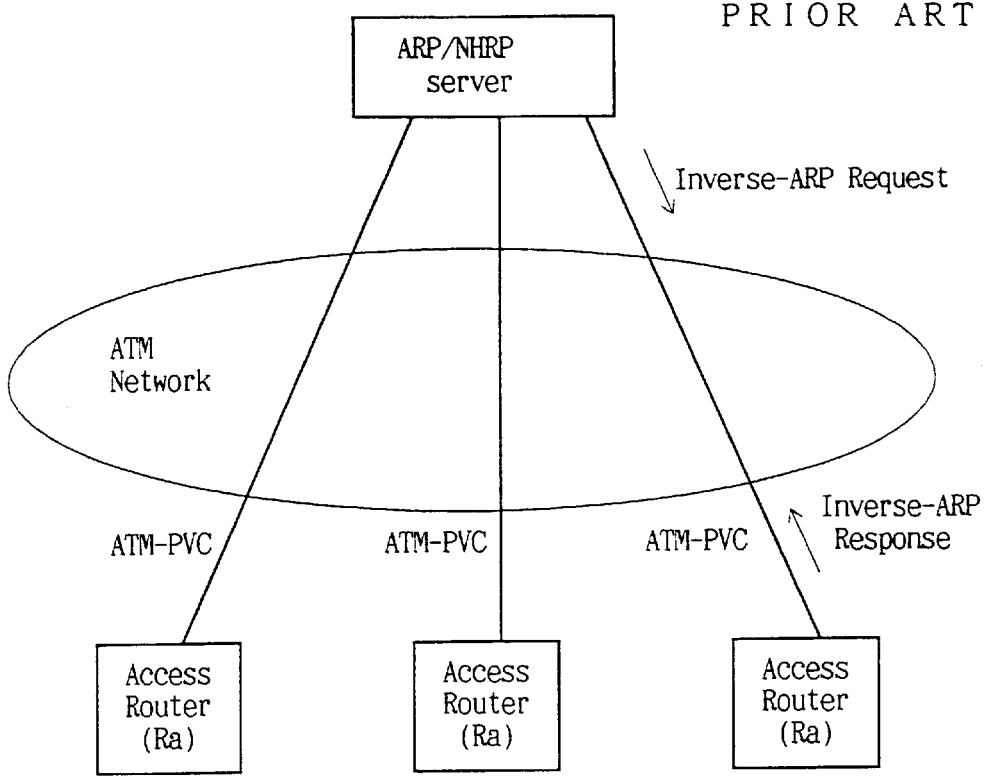
FIG. 5A is a diagram illustrating an inverse ARP function.
Figure 5B:
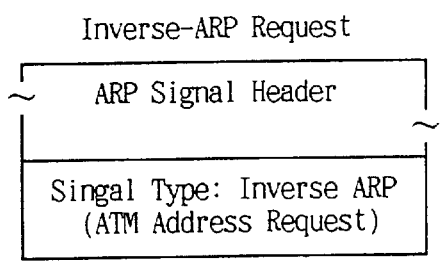
FIG. 5B shows a format of the inverse ARP request signal.
Figure 5C:
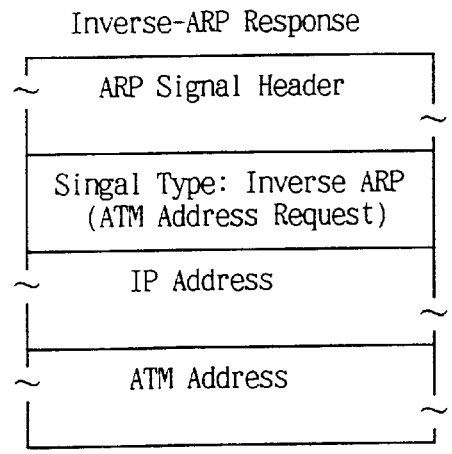
FIG. 5C shows a format of the inverse ARP response signal.

The ARP/NHRP server has a pre-established connection (ATM-PVC) with the access routers as shown in FIG. 5A. The server issues an inverse-ARP request signal in the format shown in FIG. 5B to an access router through the connection. On receipt of the request signal, the access router returns an inverse-ARP response signal including the aforesaid address information in the format shown in FIG. 5C through the connection.

Figure 18A:
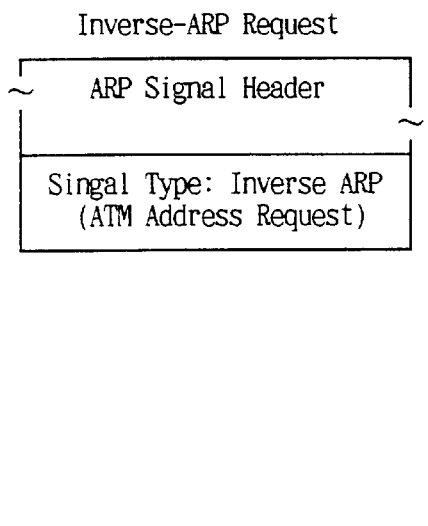
FIG. 18A shows a format of an inverse ARP request signal of the first method to collect a profile.
Figure 18B:
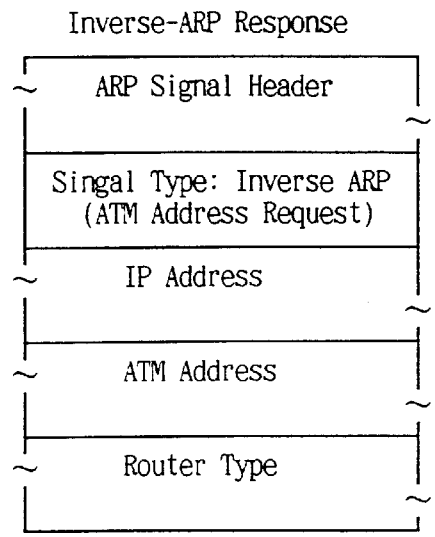
FIG. 18B shows a format of an inverse ARP response signal of the first method to collect a profile.

FIGS. 18A and 18B show a format of inverse ARP request and response signals respectively, of the first method to collect a profile, according to the second embodiment of the present invention. The ARP/NHRP server issues an inverse-ARP request signal as shown in FIG. 18A (for detailed format see FIG. 15), to an access router through the aforesaid pre-established connection. On receipt of the request signal, the access router returns an inverse-ARP response signal in the format shown in FIG. 18B, which includes the aforesaid router type in addition to the address information (hereinafter such information is generically called profile).

It is assumed that the aforesaid address resolution table 1A is composed of a memory of large storage capacity and has the management information (or router information) previously set therein for all the access routers within the network, e.g., by a maintenance procedure when access routers were configured in the network. In contrast, the address resolution table 1A of the following examples is composed of a memory of smaller storage capacity and constructed so as to store therein the management information (i.e., ATM address, router type and IP user address) of only the access routers whose management information is most probably referred to by the address resolution (ARP) request. Thus-constructed memory is called here a cache memory.

Figure 19:
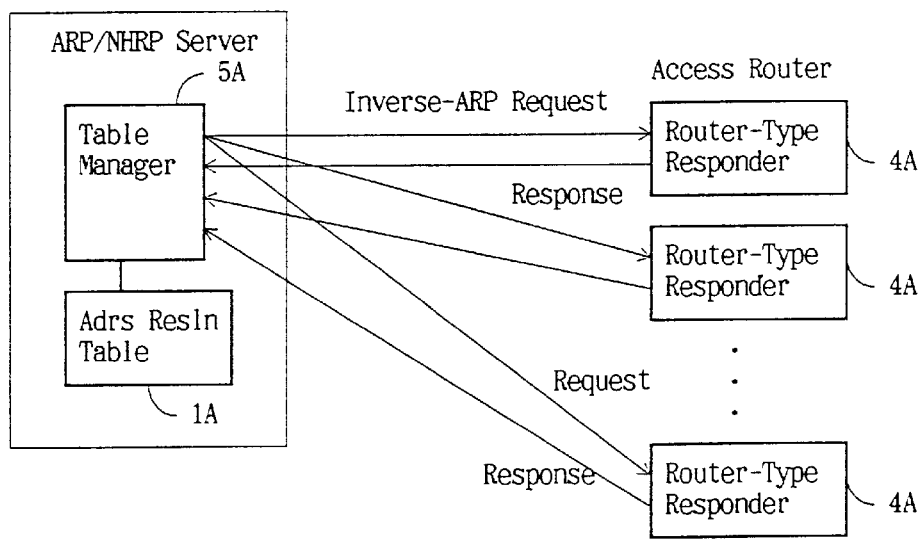
FIG. 19 illustrates the second method to collect a profile.

FIG. 19 illustrates the second method to collect a profile, according to the second embodiment of the present invention. With the address resolution table 1A (see FIG. 11) constructed as a cache memory, a table manager 5A of the ARP/NHRP server clears the management information of an access router which was not referred to by the address resolution (ARP) request for a predetermined time on a time-out check basis. Then, it releases the cleared area to be used for other access router. That is, the table manager 5A selects an access router whose management information is not registered in the table 1A and is most probably inquired by the ARP request based on some algorithm, e.g., statistics of frequency. Then it issues the inverse ARP request signal to the above-selected access router and when a router-type responder 4A of the access router responds to the request signal with a profile, stores the profile in the cleared area as the management information corresponding to the IP user address.

In summary, the table manager 5A periodically repeats the operation to clear from the table 1A, the manage information which is less frequently or infrequently referred to by the ARP request, collect the profile by issuing the inverse ARP request signal and register the profile in the table 1A as the management information. Also, if the management information of an access router is not registered in the table 1A when inquired by the ARP request, the table manager 5A issues the inverse ARP request signal and registers the collected profile in the table 1A.

Figure 20:
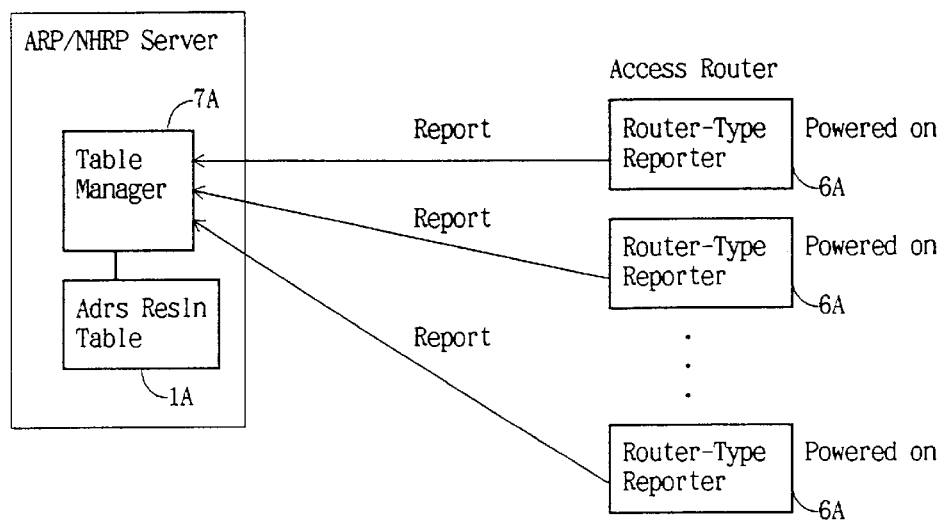
FIG. 20 illustrates the third method to collect a profile.

FIG. 20 illustrates the third method to collect a profile, according to the third embodiment. A router-type reporter 6A of the access routers periodically and voluntarily reports its profile to the ARP/NHRP server e.g., as shown in FIG. 18B (for detailed format see FIG. 15), regardless whether the address solution table 1A is constructed as a cache memory. Then, the table manager 7A of the ARP/NHRP server registers the reported profile in the table 1A as the management information.

The router-type reporter 6A may report the profile when power is turned on the access router, especially of the type A which turns power on and off occasionally or daily, or may report when user conditions, e.g., access router's protocols are changed.

Figure 21:
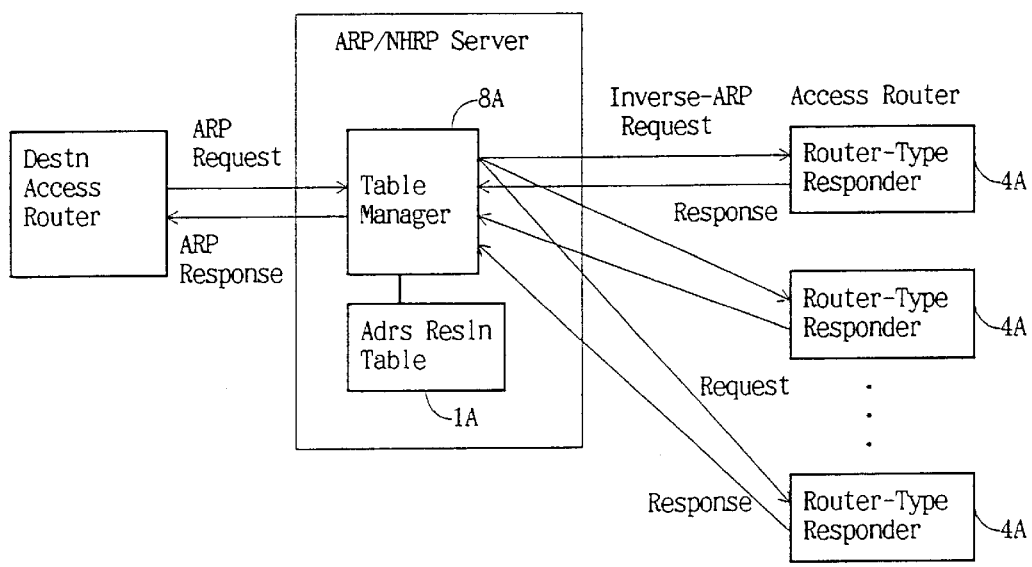
FIG. 21 illustrates the fourth method to collect a profile.

FIG. 21 illustrates the fourth method to collect a profile, according to the fourth embodiment. An example is shown here where the access router voluntarily reports the profile to the ARP/NHRP server and the address resolution table 1A is constructed as a cache memory.

Unless the management information of the destination access router is registered in the table 1A when the ARP request signal is received, the table manager 8A sequentially issues the inverse ARP request signal to a group of the access routers including the destination access router in a multi-cast fashion. The router-type responders 4A of the access router group each respond to the request signal with their profiles. Then, the table manager 8A registers the responded profiles in the table 1A as the manage information and responds to the ARP request signal with the manage information.

As described above, the present invention has added the access router's protocol to the address resolution table so as to allow the forwarding access router to recognize, prior to communication, the destination access router's protocol in the process of address resolution. Thus, the forwarding access router can transfer IP packets according to a protocol common to the forwarding and destination access routers, therefore preventing the loss of a packet and disabled communication resulting from protocol disagreement between the access routers. Further, the present invention informs the IP user of detailed reasons for a failure to transfer an IP packet.

Furthermore, the present invention reduces the storage capacity of the address resolution table by constructing the table as a cache memory. Accordingly, the present invention can construct a highly reliable and economical communication system.

What is claimed is:

1. An apparatus for selecting an access router's protocol in a communication system including a plurality of access routers for transferring a packet therebetween according to the selected protocol and a server for serving the access routers, the packet originated/terminated by users each having a user address assigned and accommodated in the respective access routers, said apparatus comprising:

storage means provided in the server for storing therein a protocol type of the access router corresponding to the user address;

protocol request means provided in a sending access router, for issuing a protocol request signal to the server including the user address of a terminating user;

protocol response means provided in the server and responsive to the protocol request signal, for referring to said storage means and responding to the protocol request signal with the protocol type of a receiving access router accommodating the user having the same user address as included in the protocol request signal and protocol selection means provided in the sending access router and based on the response by said protocol response means, for selecting a protocol common to the sending and receiving access routers to transfer the packet.

2. An apparatus according to claim 1, further comprising:

profile collection means for requesting the access router to report a profile including at least the protocol type of the access router and the user address of the user accommodated there in and when the profile is reported, for storing the protocol type in said storage means, corresponding to the user address; and first profile report means provided in the access router, for reporting the profile in response to the request of said profile collection means.

3. An apparatus according to claim 1, further comprising:

second profile report means provided in the access router, for voluntarily reporting a profile including at least the protocol type of the access router and the user address of the user accommodated therein; and register means, for storing the protocol type in said storage means, corresponding to the user address when the profile is reported by said second profile report means.

4. An apparatus for selecting an access router's protocol in a communication system having an IP network which includes an ATM network as a core network, a plurality of access routers and an address resolution server, the access routers transferring an IP packet therebetween according to the selected protocol via the ATM network and the IP packet originated/terminated by IP users each having a user address assigned and accommodated in the respective access routers, the address resolution server receiving an address resolution request signal which includes an IP user address and responding to the address resolution request signal with an ATM address of the access router accommodating the IP user having the IP user address included in the signal, said apparatus comprising:

storage means provided in the address resolution server, for storing therein a protocol type of the access router corresponding to the IP user address;

protocol request means provided in a sending access router, for issuing the protocol request signal including the IP user address of a terminating user;

protocol management means provided in the address resolution server and responsive to the protocol request signal, for referring to said storage means and responding to the protocol request signal with the protocol type of the receiving access router accommodating the IP user having the same IP user address as included in the protocol request signal; and protocol selection means provided in the sending access router, for selecting a protocol common to the sending and receiving access routers to transfer the IP packet based on the response by said protocol management means.

5. An apparatus according to claim 4, wherein the protocol request signal is the address resolution request signal and said protocol management means responds to the signal with the ATM address and the protocol.

6. An apparatus according to claim 4, further comprising:

first register means provided in the address resolution server, for issuing a profile request signal to the access router, requesting to report a profile including at least the protocol type of the access router and the IP user address of the IP user accommodated therein and when the profile is reported, for storing the protocol type in said storage means, corresponding to the IP user address; and first profile report means provided in the access router, for reporting the profile in response to the profile request signal.

7. An apparatus according to claim 5, wherein the profile request signal is an inverse address resolution request signal, said first profile report means reports the ATM address and protocol type of the access router and the IP user address of an IP user accommodated therein, and said first register means stores the ATM address and protocol type in said storage means, corresponding to the IP user address.

8. An apparatus according to claim 4, further comprising:

second profile report means provided in the access router, for voluntarily reporting a profile including at least the ATM address and protocol type of the access router and the IP user address of the IP user accommodated therein; and second register means provided in the address resolution server, for storing the the ATM address and protocol type in said storage means, corresponding to the IP user address when the profile is reported by said second profile report means.

9. An apparatus according to claim 6, wherein
said storage means has storage areas storing the ATM address and protocol type of the access routers smaller in number than those installed in the communication system, and
said first or second register means clears at least a part of the storage areas and stores the ATM address and protocol type in the cleared storage areas based on the profile reported by said first or second profile report means, respectively.

10. An apparatus according to claim 6, wherein
said first register means issues the profile request signal if the requested protocol type is not stored in said storage means when the protocol request signal is received.

11. An apparatus according to claim 8, wherein
said second profile report means reports the profile when the access router is powered on.

12. An apparatus according to claim 4, wherein
said selection means notifies the originating IP user of a failure to transfer the IP packet when a common protocol type is not found.

13. An apparatus according to claim 4, wherein
said selection means notifies the originating IP user of the ATM address and protocol type of the second access router.

14. A method for selecting an access router's protocol in a communication system including a plurality of access routers for transferring a packet there between according to the selected protocol and a server for serving the access routers, the packet originated/terminated by users each having a user address assigned and accommodated in the respective access routers, said method comprising the steps of:

(a) providing storage means in the server for storing therein a protocol type of the access router corresponding to the user address;

(b) in a sending access router, issuing a protocol request signal to the server including the user address of a terminating user;

(c) receiving the protocol request signal and referring to said storage means, responding to the protocol request signal with the protocol type of a receiving access router accommodating the user having the same user address as included in the protocol request signal; and (d) selecting a protocol common to the sending and receiving access routers to transfer the packet based on the response of step (c).

15. A method for selecting an access router's protocol in a communication system having an IP network which includes an ATM network as a core network, a plurality of access routers and an address resolution server, the access routers transferring an IP packet therebetween according to the selected protocol via the ATM network and the IP packet originated/terminated by IP users each having a user address assigned and accommodated in the respective access routers, the address resolution server receiving an address resolution request signal which includes an IP user address and responding to the address resolution request signal with an ATM address of the access router accommodating the IP user having the IP user address included in the signal, said method comprising the steps of:

(a) in the address resolution server, providing storage means for storing therein a protocol type of the access router corresponding to t he IP user address;

(b) in a sending access router, issuing the protocol request signal including the IP user address of a terminating user;

(c) in the address resolution server, receiving the protocol request signal and referring to the storage means, responding to the protocol request signal with the protocol type of the receiving access router accommodating the IP user having the same IP user address as included in the protocol request signal; and (d) in the sending access router, selecting a protocol common to the sending and receiving access routers to transfer the IP packet based on the response in said step (c).

16. An apparatus for selecting an access router's protocol in a communication system having a first network which includes a second network, a plurality of access routers for transferring a packet therebetween according to the selected protocol via the second network and a server for serving the access routers, the packet originated/terminated by users each having a user address assigned and accommodated in the respective access routers, said apparatus comprising:

storage means provided in the server, for storing therein a protocol type of the access router corresponding to the user address;

protocol request means provided in a sending access router, for issuing a protocol request signal to the server including the user address of a terminating user;

protocol response means provided in the server and responsive to the protocol request signal, for referring to said storage means and responding to the protocol request signal with the protocol type of a receiving access router accommodating the user having the same user address as included in the protocol request signal; and protocol selection means provided in the sending access router and based on the response by said protocol response means, for selecting a protocol common to the sending and receiving access routers to transfer the packet.

17. A method for selecting an access router's protocol in a communication system having a first network which includes a second network, a plurality of access routers for transferring a packet therebetween according to the selected protocol via the second network and a server for serving the access routers, the packet originated/terminated by users each having a user address assigned and accommodated in the respective access routers, said method comprising the steps of:

(a) providing storage means in the server for storing therein a protocol type of the access router corresponding to the user address;

(b) in a sending access router, issuing a protocol request signal to the server including the user address of a terminating user;

(c) receiving the protocol request signal and referring to said storage means, responding to the protocol request signal with the protocol type of a receiving access router accommodating the user having the same user address as included in the protocol request signal; and (d) selecting a protocol common to the sending and receiving access routers to transfer the packet based on the response of step (c).

18. A sending access router in a communication system, for forwarding a packet to a receiving access router according to a protocol, the packet being directed to a user accommodated in the receiving access router, the user having a user address assigned, said sending access router comprising:

protocol request means for issuing a protocol request signal including the user address of a terminating user; and protocol selection means for selecting, when a response to the protocol request signal is received, a protocol common to both the sending and receiving access routers to send the packet based on the selected protocol.

19. A server in a communication system including a plurality of access routers for transferring a packet therebetween according to a protocol, the packet originated/terminated by users each having a user address assigned and accommodated in the respective access routers, said server comprising:

storage means provided in said server, for storing therein a protocol type of the access router corresponding to the user address;

protocol response means, when receiving a protocol request signal including the user address from the access router, for responding to the protocol request signal with the protocol type of the access router by referring to said storage means based on the user address included in the protocol request signal.

* * * * *